US012036805B2

(12) United States Patent
Goldstein

(10) Patent No.: US 12,036,805 B2
(45) Date of Patent: Jul. 16, 2024

(54) LASER ABLATION FOR LATENT IMAGE INDICIA

(71) Applicant: VerifyMe, Inc., Rochester, NY (US)

(72) Inventor: Keith Goldstein, Framingham, MA (US)

(73) Assignee: VerifyMe, Inc., Lake Mary, FL (US)

( * ) Notice: Subject to any disclaimer, the term of this patent is extended or adjusted under 35 U.S.C. 154(b) by 443 days.

(21) Appl. No.: 17/512,291

(22) Filed: Oct. 27, 2021

(65) Prior Publication Data

US 2022/0134789 A1 May 5, 2022

Related U.S. Application Data

(60) Provisional application No. 63/109,671, filed on Nov. 4, 2020.

(51) Int. Cl.

| | |
|---|---|
| ***B41M 3/00*** | (2006.01) |
| ***B41J 11/00*** | (2006.01) |
| ***B41M 3/14*** | (2006.01) |
| ***B41M 5/00*** | (2006.01) |
| ***B41M 5/24*** | (2006.01) |

(52) U.S. Cl.

CPC .............. *B41M 3/005* (2013.01); *B41M 3/14* (2013.01); *B41M 5/0011* (2013.01); *B41M 5/24* (2013.01); *B41J 11/0015* (2013.01)

(58) Field of Classification Search

CPC ...... B41J 11/0015; B41M 3/005; B41M 3/14; B41M 5/0011; B41M 5/24

See application file for complete search history.

(56) References Cited

U.S. PATENT DOCUMENTS

| | | | |
|---|---|---|---|
| 6,644,764 B2 | 11/2003 | Stephens, Jr. | |
| 6,813,011 B2 | 11/2004 | Gardner et al. | |
| 7,252,239 B2 | 8/2007 | Braun | |
| 8,400,673 B2 | 3/2013 | Depta et al. | |
| 8,936,846 B2 | 1/2015 | Depta et al. | |
| 9,826,219 B2 | 11/2017 | Kawamura | |
| 9,844,970 B2 | 12/2017 | Lesur | |
| 10,259,256 B2 | 4/2019 | Nikkila | |
| 10,783,734 B2 | 9/2020 | Goldstein | |
| 2002/0041372 A1* | 4/2002 | Gardner | G07F 7/086 356/71 |
| 2013/0200606 A1 | 8/2013 | Omar | |
| 2019/0315149 A1 | 10/2019 | Biernacki et al. | |
| 2020/0180347 A1 | 6/2020 | Ederer et al. | |

FOREIGN PATENT DOCUMENTS

| | | |
|---|---|---|
| DE | 102007058601 | 6/2009 |
| EP | 1661729 | 5/2006 |
| WO | WO2005108110 | 11/2005 |

* cited by examiner

*Primary Examiner* — Thinh H Nguyen

(74) *Attorney, Agent, or Firm* — McHale & Slavin, P.A.

(57) ABSTRACT

A system and method for creating latent image indicia that includes a variable mark. The latent image indicia is made of pigmented ink that can only be viewed when illuminated with a specific frequency of light. The pigmented ink is printed in a solid patch by a conventional printing process. The variable mark in the pigmented ink is created by laser ablation of the pigment. The laser ablation is done after the ink printing as a separate step.

10 Claims, 6 Drawing Sheets

LASER ABLATION FOR LATENT IMAGE INDICIA

PRIORITY CLAIM

In accordance with 37 C.F.R. 1.76, a claim of priority is included in an Application Data Sheet filed concurrently herewith. Accordingly, the present invention claims priority based upon Provisional Patent Application No. 63/109,671, filed Nov. 4, 2020, entitled "Laser Ablation for Latent Image Indicia". The contents of the above reference application are incorporated herein by reference.

FIELD OF THE INVENTION

The invention relates to latent inks and coatings intended to be substantially undetectable except under specific activation conditions that are operable to be kept confidential, or, if known, are not easily reproduced.

BACKGROUND OF THE INVENTION

There are many methods by which latent markings on an item can be applied, modified, and exposed. Latent inks and/or coatings can be used to apply indicia to a surface wherein the indicia is a variable mark. The latent inks and/or coatings are only visible under certain conditions. It is generally known in the prior art to provide a method for printing latent inks and/or coatings that contain phosphor-based particles. It is also generally known in the prior art to provide a method for creating a variable mark on the latent inks and/or coatings using laser ablation. Prior art patent documents include:

U.S. Pat. No. 9,826,219, which is directed to a method for producing a marking in a coating on a substrate or on the surface of a molding, where the marking represents a negative marking within a luminescent surrounding field and is generated using a laser beam, to a marking produced with the aid of the method, and to the use thereof, in particular for the labeling of products.

U.S. Pat. No. 8,936,846, which is directed to a layer-type value document comprising an ink mixture in one layer, such as a value document, especially a banknote, having a sequence of layers into which visually and/or mechanically perceptible identifiers in the form of patterns, letters, numbers or images are introduced by the action of laser radiation. According to the patent, the sequence of layers includes a marking layer composed of an ink mixture exhibiting a laser-radiation-absorbing mixture component and a laser-radiation-transparent mixture component, the identifiers being visually and/or mechanically perceptible due to an irreversible change in the optical properties of the ink mixture, effected by the action of the laser radiation.

U.S. Patent Publication No. 20190315149, which discloses a security document with a securing element, and a method for producing thereof. The security document having a securing element placed locally or on the entire surface of a laminated or non-laminated substrate, comprising at least a marking region composed of at least one printing ink layer containing optically variable interference pigments and fluorescent pigments and/or dyes, or a printing ink layer containing optically variable interference pigments and being free of additives changing the absorption spectrum of the printing ink layer, the marking region comprising a laser marking applied by laser radiation, that is visually recognizable basing on an irreversible change of interference properties of the printing ink layer containing optically variable interference pigments and fluorescent pigments and/or dyes or printing ink layer containing optically variable interference pigments, and on a transformation, within the laser marking, of an original color demonstrating a change dependent on the observation angle into another color, demonstrating no change dependent on the observation angle.

U.S. Pat. No. 9,844,970, which discloses laser marking personalization directed to a method for personalizing a document. The method comprises generating at least a laser pulse on a support for carbonizing at least a printed pattern.

U.S. Patent Publication No. 20200180347, which discloses a security inlay for producing a security inlay for an identity document. The security inlay having optically recognizable characters for an identity document comprises a first transparent layer and a second transparent layer. The first and second transparent layers are connected to one another. A first portion of the optically recognizable characters is formed by blackened sections in at least one of the layers. A second portion of the optically recognizable characters is formed by the color coating. The first and second portions are arranged and configured to reflect visible light. Infrared light is reflected by the first portion of the optical characters. During irradiation with visible light, the security inlay thus shows first graphical information formed jointly by the first portion of the optically recognizable characters and the second portion of the optically recognizable characters. Under irradiation with infrared light, the security inlay shows second graphical information formed by the first portion of the optical characters.

U.S. Pat. No. 10,259,256 discloses a process for securing an identification document and secure identification document. More particularly, the process uses UV sensitive ink(s) to define a pattern only visible under UV radiations, by printing a first layer of a transparent ablation varnish, printing a layer of UV sensitive ink(s) over said first layer of transparent ablation varnish, removing parts of the layer of UV sensitive ink(s), by means of a laser beam, some remaining areas of said UV sensitive ink(s) defining said pattern to be revealed in color under UV radiations, and some areas, where the UV sensitive ink(s) has been removed and the laser beam has interacted with the ablation varnish, absorbing the UV radiations with the effect of creating black color.

U.S. Pat. No. 6,644,764, which discloses an integrated printing/scanning system using invisible ink for document tracking. The system includes a printing apparatus for printing an image on a print medium, and an inkjet printer apparatus for printing an invisible identification pattern, such as a barcode, on the print medium which is invisible to the naked eye under normal ambient illumination. A scanner apparatus is positioned for producing an image of the identification image for verification use. The scanner apparatus includes a light source for illuminating an imaging zone with light, including nonvisible energy components, and a camera sensitive to nonvisible light from the print medium to form an image of the nonvisible identification image. The inkjet printhead is a high resolution printhead adapted to provide inkjet barcode printing resolution at least as high as 600 dots per inch, improving edge acuity of the pattern, and permits very high density information to be imprinted on the document page. The inkjet ink includes a UV dye and an FR/AR dye. The UV dye, when illuminated with UV light, provides an image of the barcode which is visible to the naked eye. The FR/IR dye is imaged using an FR/R camera to capture electronically an image of the barcode.

U.S. Pat. No. 7,252,239, which discloses a method for producing laser-writable data carriers and data carriers. The method is for producing a data carrier having a laser-markable layer and a transparent optically variable layer overlapping therewith, at least in certain areas, wherein visually visible markings that at least partly overlap with the optically variable layer are produced in the laser-markable layer after the application of the optically variable layer. The patent further discloses a data carrier produced by the method and a semi-finished product, such as a data carrier blank that is provided for processing by the method.

U.S. Pat. No. 8,400,673, which discloses a value document, especially a banknote, having an individualizing mark that is applied at least once each to the front and the reverse of the value document. At least one of the individualizing identifiers applied to the front and reverse is applied to the value document with a non-contact method.

SUMMARY OF THE INVENTION

The present invention relates to creating latent image indicia. The method comprises the steps of printing a covert pigmented ink patch on a label, product or the like, and employing a laser to ablate the pigmented ink patch to create a variable mark, such as an alphanumeric mark, a symbol, a barcode symbology, a dot pattern, an alternating design, a geometric pattern, a printed guilloché, a digital watermark, a signature, an image or the like indicia, wherein the ablated area forms an inverse or negative image of the variable mark. The patch of pigmented ink can be formed using any print method, including offset, silkscreen, flexography and digital. The patch of convert pigmented ink can be printed on labels, packaging, aluminum cans, metal surgical instruments, and so forth using existing print equipment, and the variable mark can be added to the ablated pigmented section at a later time, such as near the end of a production line. For instance, in current practice using HP Indigo, the inclusion of a variable mark on a label or packaging must be performed early in the production process. The instant process allows the pigmented ink patch to be preprinted and the variable mark added at a later time. For example, medications that are placed in bottles, or beverage cans that are filled on a production line, can include preprinted pigmented patch(s) at an early stage of the production run, and the addition of a variable mark can be performed later in the production run by incorporating a laser marking machine on and preferably near the end of the production line.

It is an objective of the present invention to provide systems and methods for creating latent image indicia, wherein an area of latent ink containing phosphor compounds is formed on a substrate using a printing process and a variable mark is created on the area of latent ink at a later point in time using laser ablation.

In one embodiment, the present invention is directed to a system for creating latent image indicia.

In another embodiment, the present invention is directed to a method for creating latent image indicia.

These and other aspects of the present invention will become apparent to those skilled in the art after a reading of the following description of the preferred embodiment when considered with the drawings, as they support the claimed invention.

DETAILED DESCRIPTION

Figure 1A:
FIG. 1A illustrates one embodiment of a latent variable mark under ambient light.

The present invention is generally directed to systems and methods for creating latent image indicia.

In one embodiment, the present invention is directed to a system for creating latent image indicia using latent ink printing and laser ablation.

In another embodiment, the present invention is directed to a method for creating latent image indicia using ink printing and laser ablation.

None of the prior art discloses creating latent image indicia using IR-fluorescent latent ink using a combination of industrial ink printing processes and laser ablation, wherein laser ablation is operable to be applied to latent ink at a later point in time; and wherein the laser ablation does not ablate the substrate on which the latent ink is printed. Though the prior art may disclose laser ablation of a printed ultraviolet (UV) or generic fluorescent ink, there is currently no system that allows the variable mark to be created with latent ink that is fluorescent and activated by IR light as a final step in a multi-step process for creating latent image indicia.

Advantageously, the latent ink that is activated by and fluoresces at IR light is stable over time, such that the ink does not fade or degrade after exposure to ambient light. In contrast, UV inks of the prior art are not light stable, and the fluorescence of the UV ink fades over time after exposure to ambient and/or UV light. UV ink is often dye-based. Additionally, the latent ink that is activated by and fluoresces at IR light is not as easy to activate or detect as UV inks under ambient lighting conditions because of ambient light interference. Fluorescent IR ink is also harder to obtain by counterfeiters than UV inks.

Referring now to the drawings in general, the illustrations are for the purpose of describing one or more preferred embodiments of the invention, and are not intended to limit the invention thereto.

Latent markings of goods and documents during production and packaging facilitates the detection of counterfeit goods and documents by providing a way to validate authentic goods. It is beneficial for image indicia used to validate authentic goods to be latent and only detectable under certain conditions in order to prevent counterfeiters from detecting, copying, or removing said image indicia. At the same time, latent image indicia must be easily visible under the specific conditions in order to eliminate uncertainty in detection. It is also beneficial for latent image indicia to include unique, variable marks that are operable to be referenced to stored information in order to track goods and documents after their release and to further prevent counterfeiting.

In one embodiment, the present invention is directed to a system and method for creating latent image indicia, including an apparatus for printing latent ink, wherein the latent ink includes an ink carrier and at least one phosphor compound, and wherein the at least one phosphor compound is activated by and fluoresces infrared (IR) light, and an apparatus for laser ablation operable to selectively remove a partial amount of the at least one phosphor compound from the latent ink to create the latent image indicia. The latent ink is preferably pigment-based. In one embodiment, the latent image indicia of the present invention is formed using the latent ink that is not visible under visible light. In a preferred embodiment, the latent ink is up-converted by any light within the entire IR spectrum which is of longer wavelength and lower frequency than visible light. A wavelength of the IR light in the IR spectrum is preferably within a range of about 950 nm to about 1 mm. In one embodiment, the ink carrier is transparent. In another embodiment, the ink carrier is a visible color. In one embodiment, the ink carrier includes metal compounds. In one embodiment, the ink carrier is laser-transparent. In one embodiment, the ink carrier is solvent-based. In another embodiment, the ink carrier is water-based. In one embodiment, the ink carrier contains photoinitiators and is curable by UV light. Alternatively, the ink carrier is curable by LED light in another embodiment.

The fluorescent property of the latent ink is conferred by a fluorescent pigment. In a preferred embodiment, the fluorescent pigment is of archival quality, and the fluorescent quality of the fluorescent pigment remains stable for years under normal use conditions. The fluorescent pigment is preferably a fluorescent, phosphor-based pigment. In another embodiment, the fluorescent pigment is not phosphor-based. In a preferred embodiment of the present invention, the fluorescent pigment is up-converted by IR light and has a distinct emission wavelength in the IR spectrum. In another embodiment, the fluorescent pigment is up-converted by IR light and has a distinct emission wavelength in the visible light spectrum. In one embodiment, the fluorescent pigment includes at least one of doped and/or undoped metal oxides, doped metal sulfides, metal selenides, metal oxysulfides, rare-earth oxysulfides, and/or mixed oxides. The fluorescent pigment is laser-absorbing at a specific wavelength, approximately 510 nm to 560 nm, wherein other light sources such as LED can provide the required wavelength. In one embodiment, the fluorescent pigment is suspended in a solution that is mixed with the ink carrier to create the latent ink. In a preferred embodiment, a solvent of the solution is volatile and evaporates after the latent ink is printed onto a substrate. In another embodiment, the fluorescent pigment is mixed directly with the ink carrier. Pigment load is a measure of the fluorescent pigment by weight in the ink carrier. The pigment load of the latent ink is dependent on factors including, but not limited to, materials and coatings of the substrate on which the latent ink is printed, the thickness of the latent ink that is printed, and an apparatus used to detect and read the latent image indicia. For example, a lower pigment load is used for a thicker area of latent ink compared to a thinner area of latent ink. In an alternate example, a higher pigment load is used when a plastic coating on top of an area of latent ink inversely affects the visibility of the latent ink. In one embodiment, the pigment load of the latent ink ranges from about 0.25% to about 10%. In one embodiment, the fluorescent pigment is stable under visible light and/or invisible light and its fluorescent properties do not change significantly upon long-term exposure to visible light and/or invisible light. The concentration will depend on the ink carrier chemistry and print method.

Figure 1B:
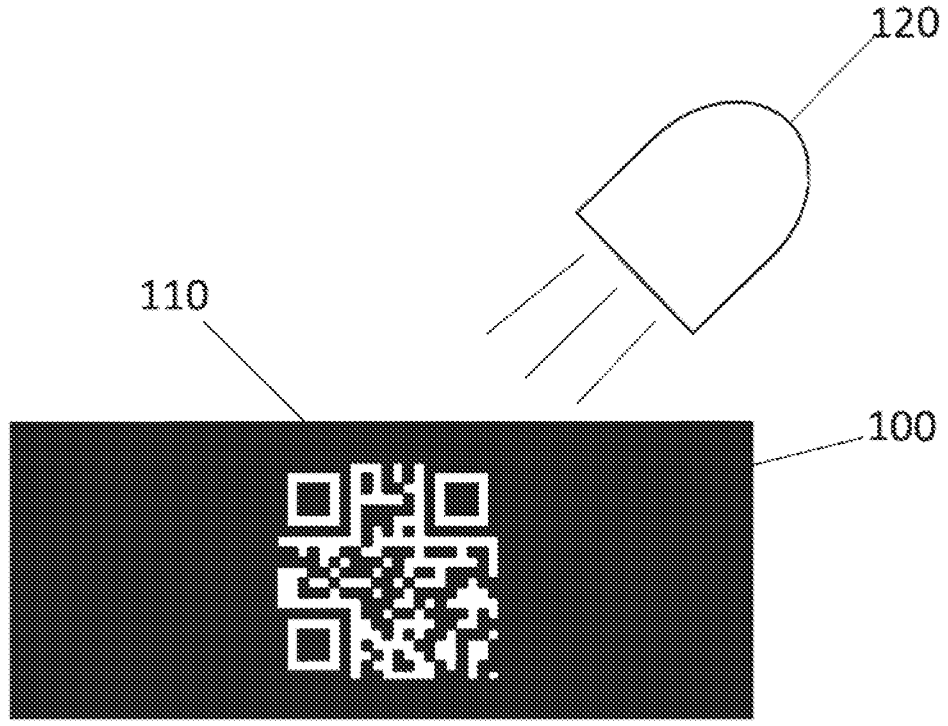
FIG. 1B illustrates one embodiment of a latent variable mark when excited by infrared (IR) light.

FIG. 1A illustrates an embodiment of the present invention. A latent ink patch 100 is not visible under ambient light. FIG. 1B illustrates an embodiment of the present invention wherein the latent ink patch 100 is illuminated by an infrared light lamp 120. The infrared light lamp activates the pigments in the latent ink patch 100 such that the latent ink patch 100 fluoresces and is visible. In this embodiment, the latent ink patch 100 includes a variable mark 110 in the form of a quick response (QR) code. Alternatively, the variable mark is an alphanumeric, a symbol, a barcode symbology, a dot pattern, an alternating design, a geometric pattern, a printed guilloché, a digital watermark, a signature, and/or an image. In one embodiment, the variable mark is a combination of two or more variable marks.

Advantageously, the system and method for applying the latent image indicia is easily integrated into a production and/or packaging process. In a preferred embodiment of the present invention, the latent ink is applied to a substrate using a conventional ink printing method. The ink printing method does not affect the fluorescent properties of the latent ink. In one embodiment, the latent ink is applied using inkjet printing. In another embodiment, the latent ink is applied using digital printing. In another embodiment, the latent ink is applied using screen printing. In yet another embodiment, the latent ink is applied using flexographic printing. In another embodiment, the latent ink is applied using gravure printing. In another embodiment, the latent ink is applied using offset printing. In yet another embodiment, the latent ink is applied using roller coating printing.

Prior art may disclose a method for directly printing latent image indicia, such as a barcode, onto a substrate using a conventional ink printing process. However, a printer that is capable of printing a complex image, such as a variable mark in latent ink, is more expensive and difficult to design and program than a printer that can print a solid patch or area of latent ink. Therefore, it is advantageous to provide a system where latent ink is operable to be printed as a solid patch of ink in the first step of creating latent image indicia. The present invention includes printing a solid patch of latent ink on a substrate without any variable mark and creating the variable mark in the solid patch of latent ink at a later point in time. In a preferred embodiment of the present invention, one uniform layer of latent ink is printed on the substrate. In another embodiment, multiple layers of latent ink are printed on the substrate. The size, shape, and thickness of the solid patch of latent ink are dependent on factors including, but not limited to, the substrate, the variable mark, and the apparatus used to detect and read the latent image indicia. The present invention is operable to print the solid patch of latent ink on a variety of substrates and surfaces including, but not limited to, plastic, polymeric materials and films, cellulose-containing materials, coated paper, uncoated paper, cardboard, glass, crystal, and/or metal. The present invention is operable to print the solid patch of latent ink on a variety of objects, including but not limited to, labels, adhesives, documents, cards, laminated cards, passports, cans, bottles, glass bottles, containers, food packaging, metal surgical devices, and medical devices. In one embodiment, the latent ink is printed on a bottle cap. In another embodiment, the latent ink is printed on a bottling line.

In one embodiment, the latent ink patch is printed on a surface that is the same color as the ink carrier of the latent ink under visible light. In another embodiment, the latent ink patch is printed on a surface that has background ink on it. In one embodiment, the background ink has the same properties as the ink carrier of the latent ink, but the background ink is not fluorescent. In another embodiment, the background ink is different from the ink carrier of the latent ink. In yet another embodiment, the surface on which the latent ink patch is printed is uncoated and unmarked. In a preferred embodiment, reflectance characteristics and a surface appearance of the latent ink patch match reflectance characteristics and a surface appearance of the background and surrounding areas of the substrate on which the latent ink patch is printed. In one embodiment, a texture of the latent ink patch matches a texture of the substrate on which the latent ink patch is printed.

In one embodiment, the substrate includes a coating. In one embodiment, the coating is a plastic, including but not limited to, a polyvinyl chloride (PVC), a polycarbonate, and/or a polyester. Alternatively, the coating is a varnish, including but not limited to, a gloss varnish, a matte varnish, and/or a UV-curable varnish. In another embodiment, the substrate is laminated.

In one embodiment, the latent ink patch is cured after it is printed. In one embodiment, the latent ink patch is cured with UV light. Alternatively, the latent ink patch is cured with LED light. In another embodiment, the latent ink patch is flashed off after it is printed. In one embodiment, a binder is added to the latent ink patch to ensure adhesion to the substrate.

The present invention includes a system for auditing and verifying an adhesion and a presence of the latent ink patch to the substrate. In one embodiment, the presence of the latent ink patch is verified by irradiation of the latent ink patch with IR light.

In a production and packaging environment, it is preferable to create a security mark, such as a variable mark, late in the production and/or packaging process so as to minimize an amount of time between creation of the security mark and presentation of the product to a consumer or user. This strategy deters counterfeiting of and/or tampering with the security mark by minimizing exposure of the security mark to potential counterfeiters before it is authenticated. Therefore, the present invention includes the variable mark being created in the latent ink patch at a later point in time, after the solid patch of latent ink has been printed by a conventional ink printing process. Before the variable mark is created, the latent ink is a uniformly fluorescent patch that is not sufficient for tracking a product or preventing counterfeiting. The variable mark is then created in the latent ink, such that the latent ink then fluoresces a specific design and/or pattern which is known to the manufacturer.

In a preferred embodiment, the infrared ink includes an IR up-converting pigment. The IR up-converting pigment converts IR light to visible light by absorbing lower energy photons and emitting higher energy photons as fluorescence. At least two low energy photons are absorbed by the IR up-converting pigment to emit one high energy photon. This process requires a high intensity light source (e.g., laser, a plurality of IR light emitting diodes (LEDs)). Additionally, this process typically requires a controlled lighting environment that limits ambient light. In one embodiment, the IR up-converting pigment includes a phosphor. In one embodiment, the IR up-converting pigment includes at least one of doped or undoped metal oxides, doped metal sulfides, metal selenides, metal oxysulfides, rare-earth oxysulfides, and/or mixed oxides. In one embodiment, the IR up-converting pigment has a particle size of about 2 microns (e.g., 2 microns±10%). Alternatively, the IR up-converting pigment has a particle size of between about 1 micron (e.g., 1 micron±10%) to about 10 microns (e.g., 10 microns±10%). The preferred IR up-converting pigment is a metal oxysulfide phosphor having a particle size distribution—by Coulter Counter (50 μm Aperture) with ultrasonic dispersion, sizes at listed Volume %:

| vol % | 5 | 25 | 50 | 75 | 95 |
|---|---|---|---|---|---|
| μm | 0.6 | 1.1 | 1.5 | 2.2 | 3.5 with a Quartile Deviation: 0.33. |

Figure 6:
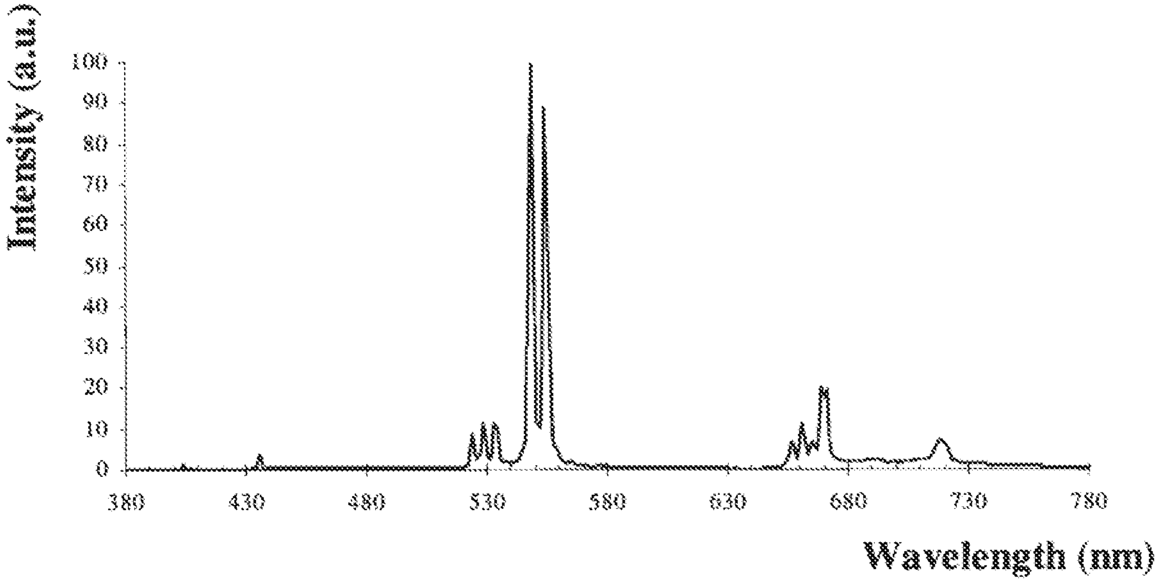
FIG. 6 is a graft of the excitation wavelength.

In a preferred embodiment, the optical property is a green emission color. However, red, blue or a combination of green, red and blue emission colors may be employed. Wavelength peaks of 548 nm and 554 nm and excitation peaks of 950 nm and 980 nm are illustrated in FIG. 6.

Figure 2:
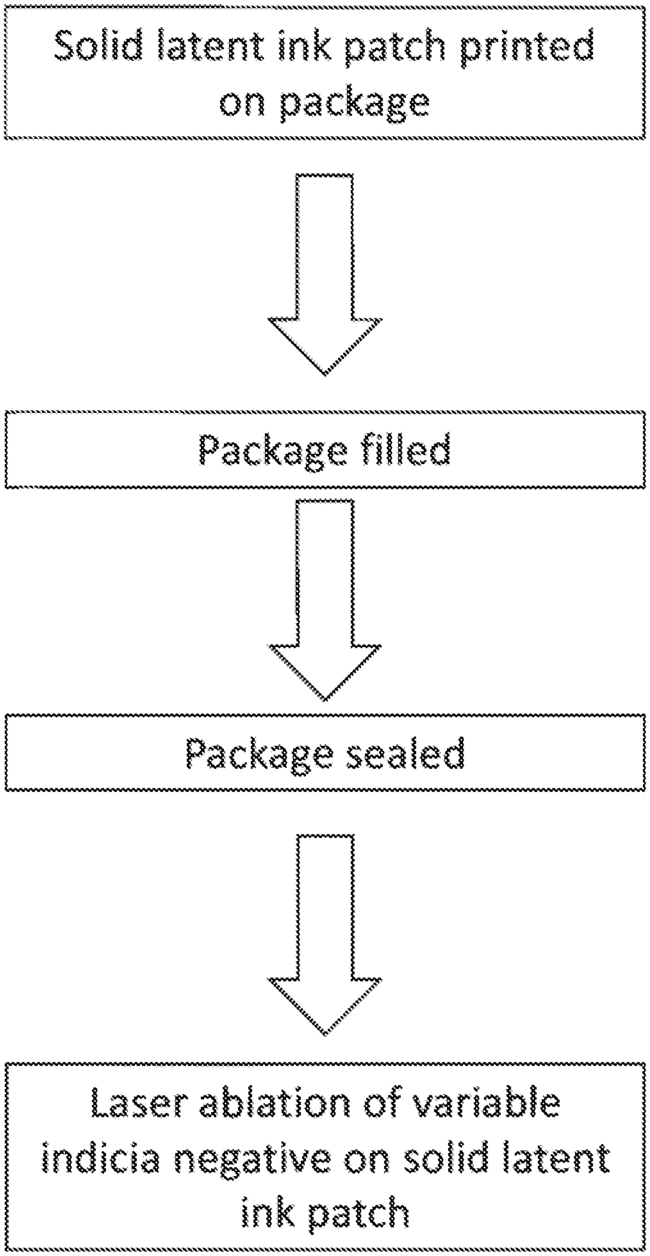
FIG. 2 illustrates one embodiment of the process for creating latent image indicia.

FIG. 2 is an embodiment of the present invention wherein the latent ink is printed as a solid patch onto a package and the variable mark is created in the latent ink patch via laser ablation as the final step in the packaging process.

Figure 3A:
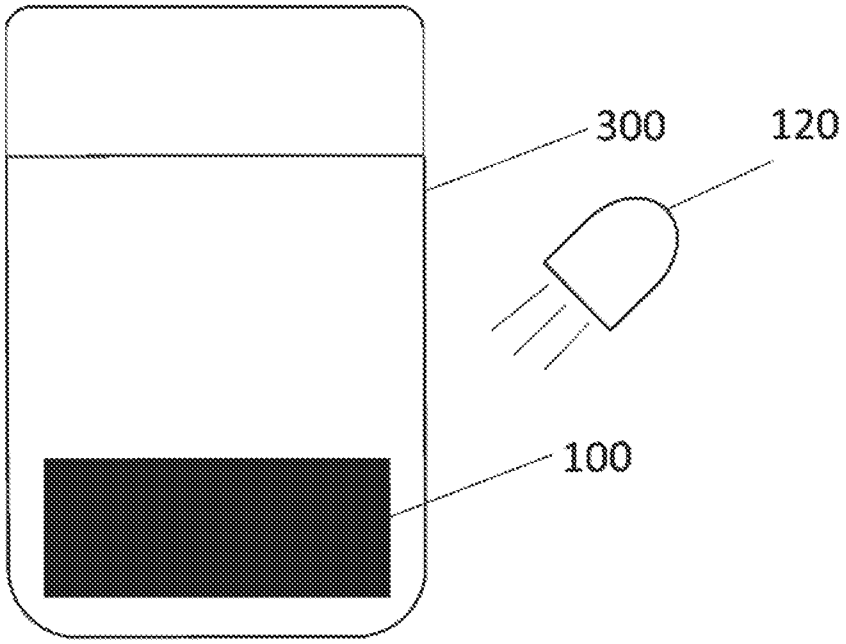
FIG. 3A illustrates one embodiment of a latent ink patch printed on a substrate when excited by IR light.

FIG. 3A illustrates an example of the present invention wherein a solid latent ink patch 100 is printed on a medicine bottle 300 before the medicine bottle is filled by an assembly line. The latent ink patch is visible under an infrared light lamp 120 at the beginning of the process to verify that the printing is successful. The medicine bottle is then filled with medicine, capped, and sealed by the assembly line.

Figure 3B:
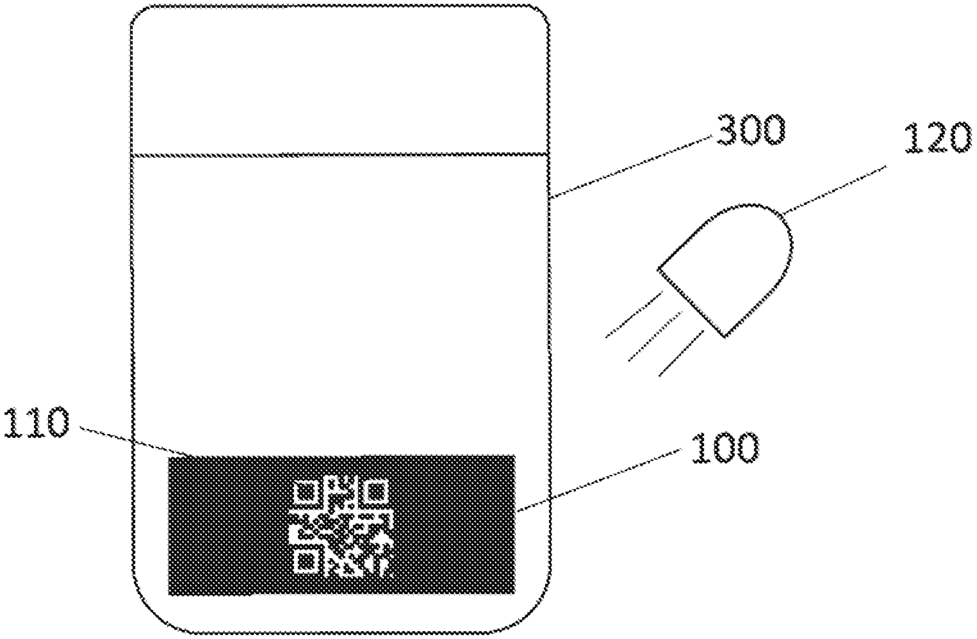
FIG. 3B illustrates one embodiment of a latent ink patch printed on a substrate after laser ablation when excited by IR light.

FIG. 3B illustrates the medicine bottle at the end of the filling and packaging process. The variable mark 110 is created on the latent ink patch 100 using laser ablation after the medicine bottle has been filled and sealed. The latent ink patch is visible under an infrared light lamp 120 at the end of the process to verify the variable mark. The medicine bottle is then shipped to its destination.

The variable mark of the present invention is created in the latent ink patch by laser ablation. Laser ablation occurs when the energy of a laser beam is absorbed by a surface and causes particles on the surface to heat until they evaporate or sublimate. The laser beam of the present invention is operable to remove the fluorescent pigment from the latent ink patch in a predetermined pattern, such that the latent ink that has been exposed to the laser beam no longer fluoresces. In one embodiment, the laser beam does not remove the ink carrier of the latent ink patch. The laser beam does not affect the background or surrounding area on which the latent ink patch is printed or the substrate or surface on which the latent ink patch is printed.

In one embodiment, the laser is a solid-state laser. In one embodiment, the laser is a fiber laser. In one embodiment, the laser is a neodymium-doped yttrium aluminum garnet (Nd:YAG) laser. In another embodiment, the laser is a neodymium-doped yttrium orthovanadate (Nd:$YVO_4$) laser. In one embodiment, the laser is a gas laser. In one embodiment, the laser is a carbon dioxide ($CO_2$) laser. In one embodiment, the laser ablation beam is a pulsed laser beam.

In a preferred embodiment of the present invention, a power, a duration, a pulse, a dwell time, and/or a frequency of the laser ablation beam are dependent on the latent ink patch (e.g., the fluorescent pigment, the thickness of the latent ink, the pigment load of the latent ink) and the substrate on which the latent ink patch is printed (e.g., the material of the substrate, the coating on the substrate, a thickness of the substrate). The power, the duration, the pulse, the dwell time and/or the frequency of the laser ablation beam are configured based on the substrate and the latent ink patch before ablation occurs. In one embodiment, the laser emits light at a frequency in the ultraviolet (UV) spectrum (10-400 nm). In another embodiment, the laser emits light at a frequency in the IR spectrum. In another embodiment, the laser emits visible light.

The laser ablation beam is operable to ablate the fluorescent pigment of a latent ink patch without ablating or otherwise affecting a variety of substrates and surfaces, including but not limited to plastic, polymeric materials and films, cellulose-containing materials, coated paper, uncoated paper, cardboard, glass, crystal, and/or metal. The laser ablation beam is operable to ablate the fluorescent pigment of a latent ink patch without ablating or otherwise affecting a variety of objects, including but not limited to labels, adhesives, documents, cards, laminated cards, passports, cans, bottles, glass bottles, containers, food packaging, metal surgical devices, and medical devices. The laser ablation beam is operable to create a variable mark in a latent ink patch printed on a curved surface (e.g., bottle, can). The laser ablation beam is also operable to create a variable mark in a latent ink patch printed on a textured surface.

The present invention includes the latent ink patch printing and the laser ablation of a variable mark occurring at two distinct times. The laser ablation of a variable mark is a method of marking and/or serializing each product to allow for tracking and to hinder counterfeiting. The present invention eliminates the need for specialty printing press systems that print latent image indicia directly onto a substrate by printing a solid patch of latent ink onto a substrate as a first step using a conventional ink printing process. Laser ablation of the variable mark is then performed at a later point, after the latent ink has been printed, to minimize exposure of the variable mark to potential counterfeiters as a more secure method of creating the security mark. In addition, the laser ablation process only affects the fluorescent component of the latent ink, such that the variable mark as a whole is visible when activated by distinct wavelengths of light.

The laser in the present invention removes the fluorescent pigment in the latent ink, such that the areas on the latent ink patch ablated by the laser compose a negative image of a variable mark. The laser ablates the inverse image of a variable mark, with the illumination being a patch of pigmented ink around the ablated mark.

Figure 4:
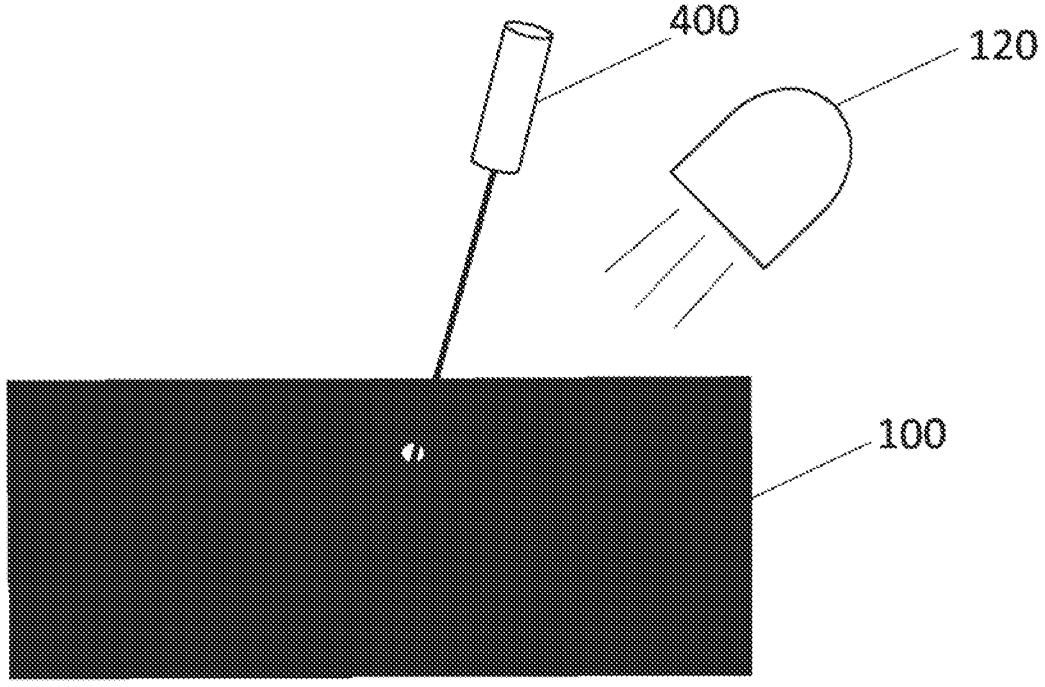
FIG. 4 illustrates one embodiment of laser ablation on a latent ink patch.

FIG. 4 illustrates an example of the inverse image ablation. The solid latent ink patch 100 is fluorescent upon activation by an infrared light lamp 120. The laser 400 ablates the fluorescent pigment in the latent ink, such that the ink is no longer fluorescent under the infrared light lamp. The variable mark contains sufficient information for product authentication, identification, and tracking. In one embodiment, the variable mark is a barcode symbology. In another embodiment, the variable mark is an alphanumeric code such as a serial number. In another embodiment, the variable mark is a two-dimensional (2D) code such as a QR code. In one embodiment of the present invention, the variable mark applied to each product includes a unique identifier. In one embodiment, the variable mark includes information about the product and/or its production process, including, but not limited to, a location, a date, a time, a shelf life, a model number, and/or a batch number. In another embodiment, the variable mark includes information about the seller and/or consumer of the product, including but not limited to a destination, transaction information, licensing information, a serial number, and/or personal identifiers of a seller and/or a consumer of the product. The variable mark is referenced to stored information, such that there is a record of the appearance and content of all variable marks applied to the products. In one embodiment, the present invention scans the variable mark after it has been created and stores the scanned data to a database. This system allows counterfeit indicia to be easily detected if it does not match the stored information. The systems and methods of the present invention can be readily altered periodically to hinder counterfeiting.

The present invention includes systems and methods for controlling the creation of latent image indicia on a product or document. The latent ink printing and the laser ablation are controlled by a computer system. In one embodiment, the computer system is connected to a server in a production and/or packaging environment. The variable mark created by laser ablation is referenced to information stored on a database. In one embodiment, the database is a cloud database. In one embodiment, the computer system sends data about the variable mark to the laser ablation system. The laser ablation system includes a conversion engine wherein the data about the variable mark is converted into a corresponding laser ablation pattern. In one embodiment, the variable mark is different for each individual substrate. The present invention is operable to automatically change the variable mark created on each substrate and update a database with information about each mark. In one embodiment, the information about each mark includes a time and a date of creation, information about the product on which the mark was created, and/or information about product shipping. In one embodiment, the present invention records data from the substrate after the latent ink printing and after the laser ablation in a database. In one embodiment, the data includes photographs of the latent ink and the variable mark.

In one embodiment, the computer system verifies that the correct variable mark has been created on a product in real time. In one embodiment, the latent image indicia is authenticated by a mobile authenticator, as described in U.S. Pat. No. 10,783,734, which is incorporated herein by reference in its entirety. In another embodiment, the latent image indicia is detected and verified by an apparatus on a production and/or packaging assembly line. The apparatus is operable to verify latent image indicia after printing and after laser ablation. In one embodiment, the apparatus includes at least one camera system. In one embodiment, the apparatus is attached to the apparatus for printing latent ink and/or the apparatus for laser ablation.

Figure 5:
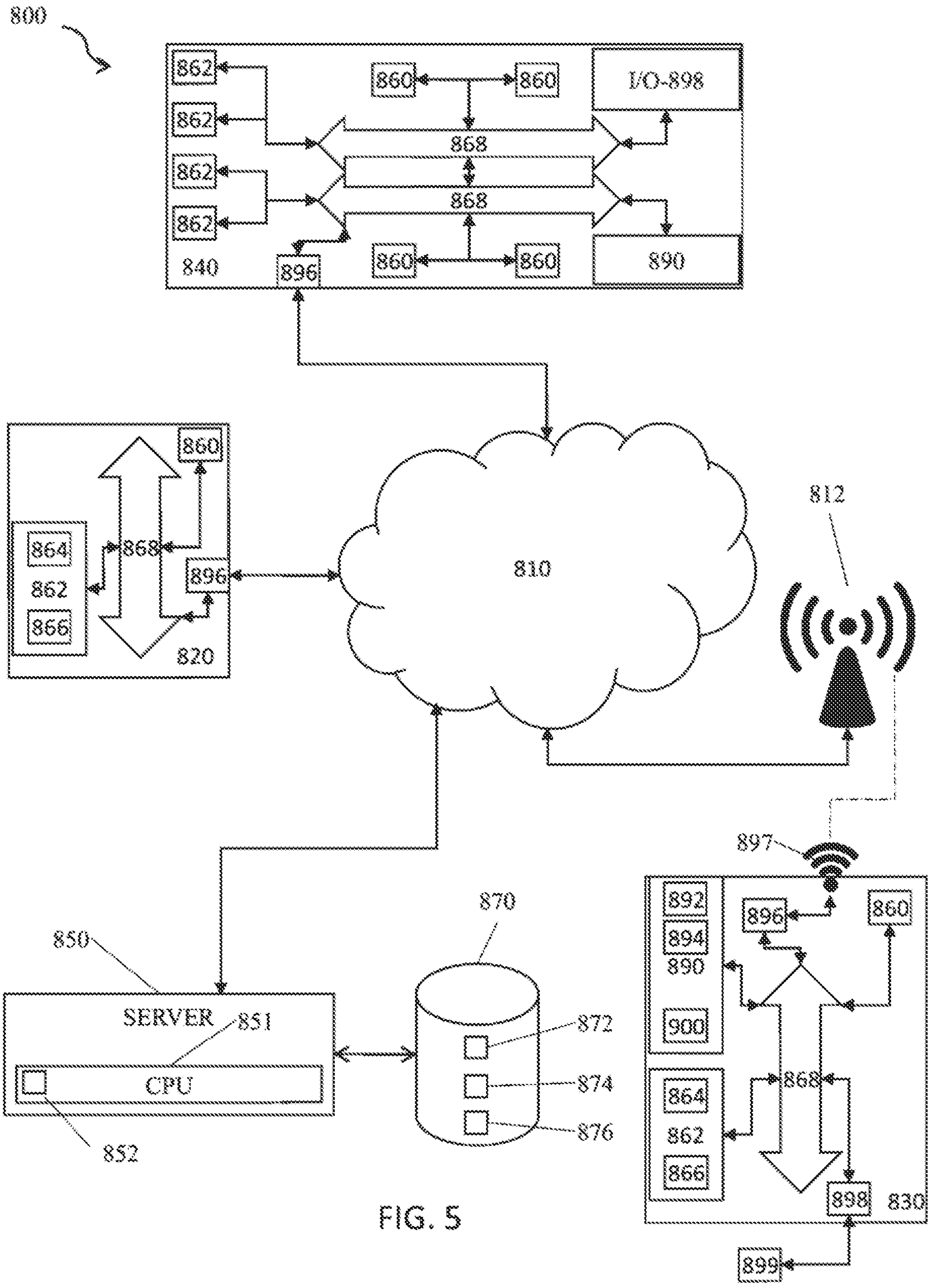
FIG. 5 is a schematic diagram of a system of the present invention.

FIG. 5 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through the network 810 with the remote, distributed user devices. The database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication, such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH, including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892, one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 5, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890, and is operable to be a single medium or multiple media (e.g., a centralized or distributed computer system) that stores the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal, such as a carrier wave or other transport mechanism, and includes any delivery media. The term "modulated data signal" means a signal that has one or more of its characteristics changed or set in a manner as to encode information in the signal.

Storage devices 890 and memory 862 include, but are not limited to, volatile and non-volatile media, such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 5, is operable to include other components that are not explicitly shown in FIG. 5, or is operable to utilize an architecture completely different than that shown in FIG. 5. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The latent security marking on a product comprising the steps of: applying a solid ink patch using an IR-fluorescent latent ink having an IR up-converting pigment to a substrate at a first step of production or product packaging, said up-converting pigment capable of emission of light at a visible wavelength in response to excitation by irradiation, the pigment may also be loaded as part of an injection molding forming a light switch, glass bottle and so forth; laser ablation of said solid ink patch as a later step of production or product packaging, said laser ablation forming at least one variable mark having an inverse image, the later step would be subsequent to the printing of labels, packaging, bottle making, switch making and so forth, the technology uniquely serializing the product; verifying said variable mark by irradiation with an IR light capable of fluorescing said IR-fluorescent latent ink; wherein said variable mark is formed late in the production or product packaging so as to minimize an amount of time between creation of said variable mark and presentation of the product to a consumer or user, whereby said laser ablation does not ablate or otherwise affect the substrate.

The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A method for creating a latent security marking on a product comprising the steps of:

applying a solid ink patch using an IR-fluorescent latent ink having an IR up-converting pigment to a substrate at a first step of production or product packaging, said up-converting pigment capable of emission of light at a visible wavelength in response to excitation by irradiation;

laser ablation of said solid ink patch as a later step of production or product packaging, said laser ablation forming at least one variable mark having an inverse image;

verifying said variable mark by irradiation with an IR light capable of fluorescing said IR-fluorescent latent ink;

wherein said variable mark is formed late in the production or product packaging so as to minimize an amount of time between creation of said variable mark and presentation of the product to a consumer or user; whereby said laser ablation does not ablate or otherwise affect the substrate.

2. The method for creating a latent security marking according to claim 1 wherein said up-converting pigment is a phosphor and includes at least one of doped or undoped metal oxides, doped metal sulfides, metal selenides, metal oxysulfides, rare-earth oxysulfides, and/or mixed oxides.

3. The method for creating a latent security marking according to claim 2 wherein said up-converting pigment is a phosphor having a wavelength peak of about 548 nm and 554 nm, and excitation peaks of about 950 nm and 980 nm.

4. The method for creating a latent security marking according to claim 1 wherein said IR up-converting pigment has a particle size of between about 1 micron and 10 microns.

5. The method for creating a latent security marking according to claim 1 wherein said variable mark is a quick response (QR) code.

6. The method for creating a latent security marking according to claim 1 wherein said variable mark is selected from the group consisting of an alphanumeric mark, a symbol, a barcode symbology, a dot pattern, an alternating design, a geometric pattern, a printed guilloché, a digital watermark, a signature, or an image.

7. The method for creating a latent security marking according to claim 1 wherein said variable mark is a combination of two or more variable marks.

8. The method for creating a latent security marking according to claim 1 wherein said step of laser ablation removes the fluorescent pigment from said ink patch in a predetermined pattern such that the latent ink that has been exposed to the laser no longer fluoresces.

9. The method for creating a latent security marking according to claim 1 wherein said step of laser ablation is performed by a laser selected from the group of: a solid-state laser, a fiber laser, a gas laser, a neodymium-doped yttrium aluminum garnet (Nd:YAG) laser, a neodymium-doped yttrium orthovanadate (Nd:$YVO_4$) laser, a carbon dioxide ($CO_2$) laser.

10. The method for creating a latent security marking according to claim 9 wherein said laser provides a pulsed laser beam.

* * * * *